United States Patent
Dubitzky et al.

(10) Patent No.: US 10,025,635 B2
(45) Date of Patent: Jul. 17, 2018

(54) ADAPTIVE SCHEDULING POLICY FOR JOBS SUBMITTED TO A GRID

(71) Applicant: International Business Machines Corporation, Armonk, NY (US)

(72) Inventors: Zvi Dubitzky, Tivon (IL); Avi Teperman, Haifa (IL); Bazarbek Uatay, Astana (KZ)

(73) Assignee: International Business Mahcines Corporation, Armonk, NY (US)

( * ) Notice: Subject to any disclaimer, the term of this patent is extended or adjusted under 35 U.S.C. 154(b) by 43 days.

(21) Appl. No.: 14/298,985

(22) Filed: Jun. 9, 2014

(65) Prior Publication Data

US 2015/0355945 A1    Dec. 10, 2015

(51) Int. Cl.
  *G06F 9/50*  (2006.01)
(52) U.S. Cl.
  CPC .................. *G06F 9/5027* (2013.01)
(58) Field of Classification Search
  CPC ..................................... G06F 9/5072
  See application file for complete search history.

(56) References Cited

U.S. PATENT DOCUMENTS

| | | |
|---|---|---|
| 7,406,691 B2 | 7/2008 | Fellenstein et al. |
| 8,171,481 B2 | 5/2012 | Benedetti et al. |
| 2007/0101339 A1* | 5/2007 | Shrum .................. H04L 47/805 718/104 |
| 2008/0066070 A1* | 3/2008 | Markov ................. G06F 9/4818 718/103 |
| 2009/0031312 A1 | 1/2009 | Mausolf et al. |
| 2009/0271526 A1* | 10/2009 | Watanabe ........... H04L 67/2819 709/236 |
| 2009/0276781 A1* | 11/2009 | Chan ..................... G06F 9/4881 718/103 |

FOREIGN PATENT DOCUMENTS

EP       1630671       3/2006

OTHER PUBLICATIONS

Huang et al., "Survey on Resource Allocation Policy and Job Scheduling Algorithms of Cloud Computing", Journal of software vol. 8, Issue 2, p. 480-487, Feb. 2013.

* cited by examiner

*Primary Examiner* — Li B Zhen
*Assistant Examiner* — Amir Soltanzadeh
(74) *Attorney, Agent, or Firm* — Nicole A. Spence

(57) ABSTRACT

Machines, systems and methods for providing a job description for execution in a computing environment, the method comprising receiving a job description, wherein the job description defines a set of job alternatives based on an order of priority and conditions associated with execution of the job alternatives; processing the job alternatives to determine whether resources for executing at least a first job alternative are available, considering respective first conditions defined in the job description for the first job alternative; selecting a first computing element implemented in a virtualized computing environment, wherein the selected first computing element has sufficient resources to satisfy resource requirements defined in the job description for the first job alternative; and submitting the job to the first computing element for execution.

4 Claims, 3 Drawing Sheets

ADAPTIVE SCHEDULING POLICY FOR JOBS SUBMITTED TO A GRID

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to implementing an adaptive scheduling policy for jobs submitted to a grid in a computing environment.

BACKGROUND

Grid computing refers to a collection of computing resources residing in multiple locations in a distributed system where heterogeneous computing resources are geographically dispersed. In a grid computing environment, a computing job may be scheduled for execution using certain resources in the grid. A user may specify the job requirements in terms of number, types and amount of resources (e.g., CPUs, memory, storage, etc.) needed to successfully perform the job.

Typically, job requirements are specified using a specific language known as the Job Description Language (JDL). JDL provides a user with the ability to define a job description that includes an exact specification for job resources. JDL, however, lacks context for defining alternative options, if the exact resources are not available for the job. In other words, if the job description for the required resources does not match the currently available resources, the job request will be either denied or delayed.

Thus, a job may be rejected or delayed even if a user would have been agreeable to the job being started with a different allocation of resources or at a different time. For example, a user may submit a job description to request five CPUs for a job, where only three CPUs are available. As an alternative to waiting, the user may accept three CPUs. But the user has no way to define this alternative in the job description and as a result the job will be rejected or delayed until five CPUs become available.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for providing a job description for execution in a computing environment is provided. The method comprises receiving a job description, wherein the job description defines a set of job alternatives based on an order of priority and conditions associated with execution of the job alternatives; processing the job alternatives to determine whether resources for executing at least a first job alternative are available, considering respective first conditions defined in the job description for the first job alternative; selecting a first computing element implemented in a virtualized computing environment, wherein the selected first computing element has sufficient resources to satisfy resource requirements defined in the job description for the first job alternative; and submitting the job to the first computing element for execution.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

As provided in further detail below a grid computing environment (e.g., European Grid Infrastructure (EGI)) may be implemented over a virtualized set of servers (e.g., in a cloud) for improved resource utilization. Due to over commitment of resources, a longer execution time may be anticipated if the exact resources to run the job according to a job description are not available at the time of submission, even if the user is amenable to utilizing a different set of resources for the job. In the following, an implementation is disclosed that allows for a more flexible JDL variant that accommodates alternative user options.

Figure 1:
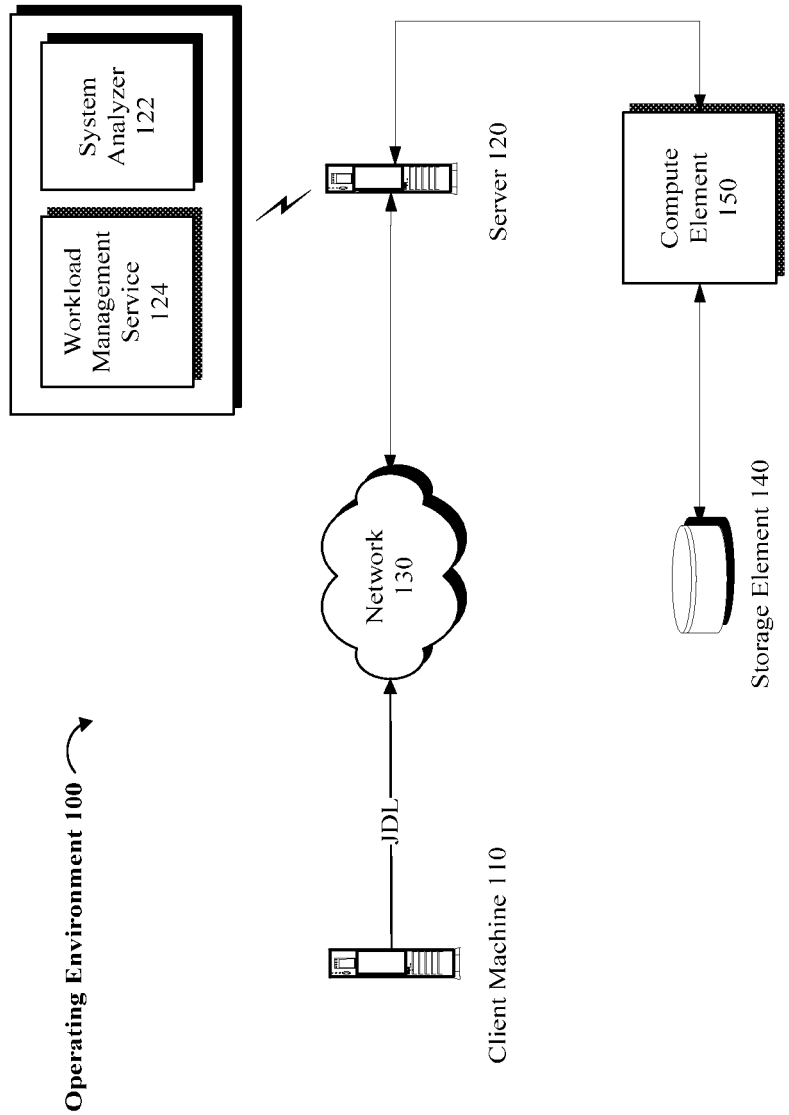
FIG. 1 illustrates an exemplary operating environment in accordance with one or more embodiments, wherein a job description is submitted for scheduling a job.
Figure 2:
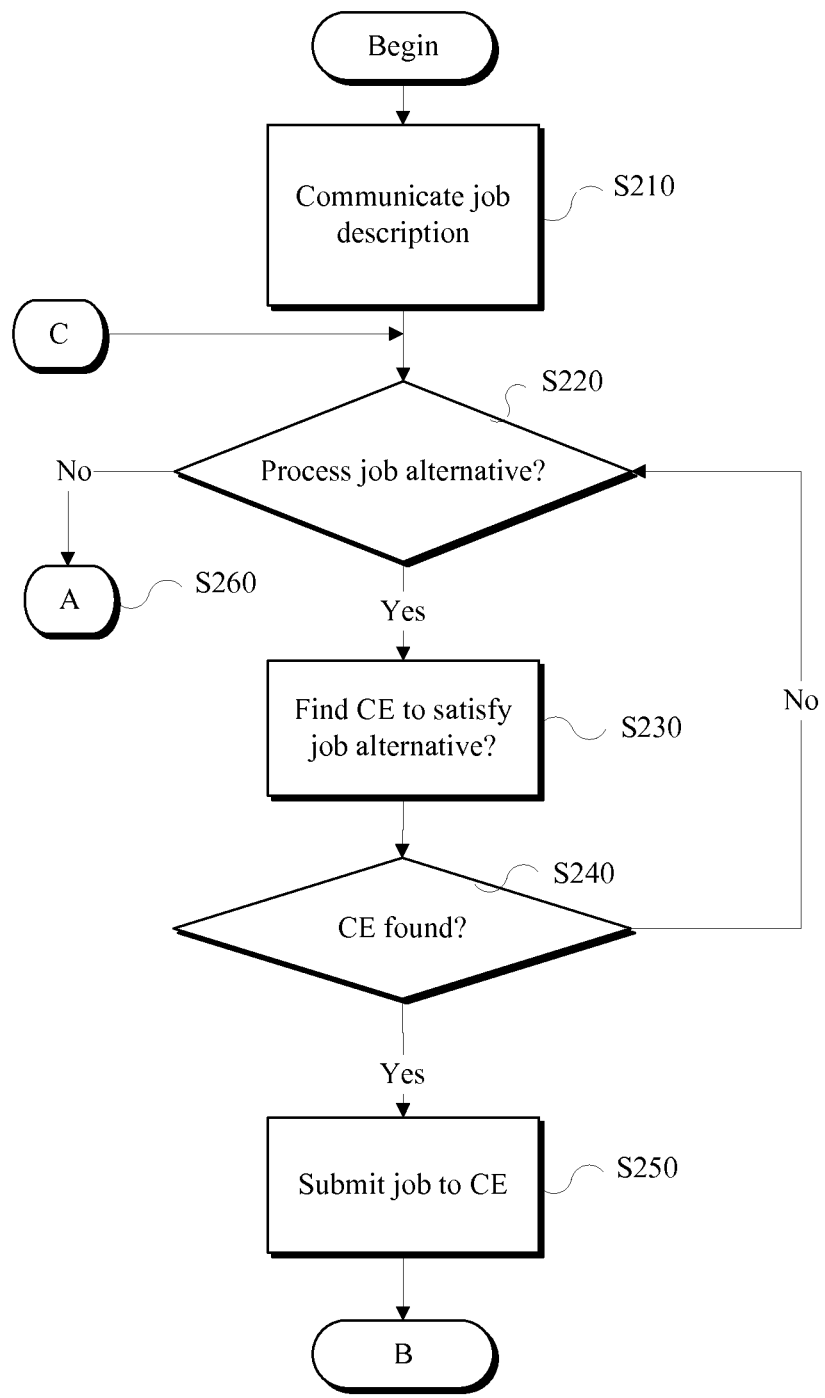
FIGS. 2 and 3 are flow diagrams of exemplary methods for processing a job description in accordance with one embodiment.

Referring to FIGS. 1 and 2, an exemplary operating environment 100 is illustrated in which a user uses a client machine 110 (e.g., a computer) to communicate a job description (S210) to a workload management service (WMS) 124 module and a system analyzer (SA) 122. Depending on implementation, WMS 124 may process job alternatives defined in the job description to decide which compute element (CE) 150 would be suitable to satisfy one or more job alternatives (S220, S230). If none of the defined job alternatives can be satisfied (i.e., due to lack of resources) or if no job alternatives specified, then remedial measures may be taken (S260).

Figure 3:
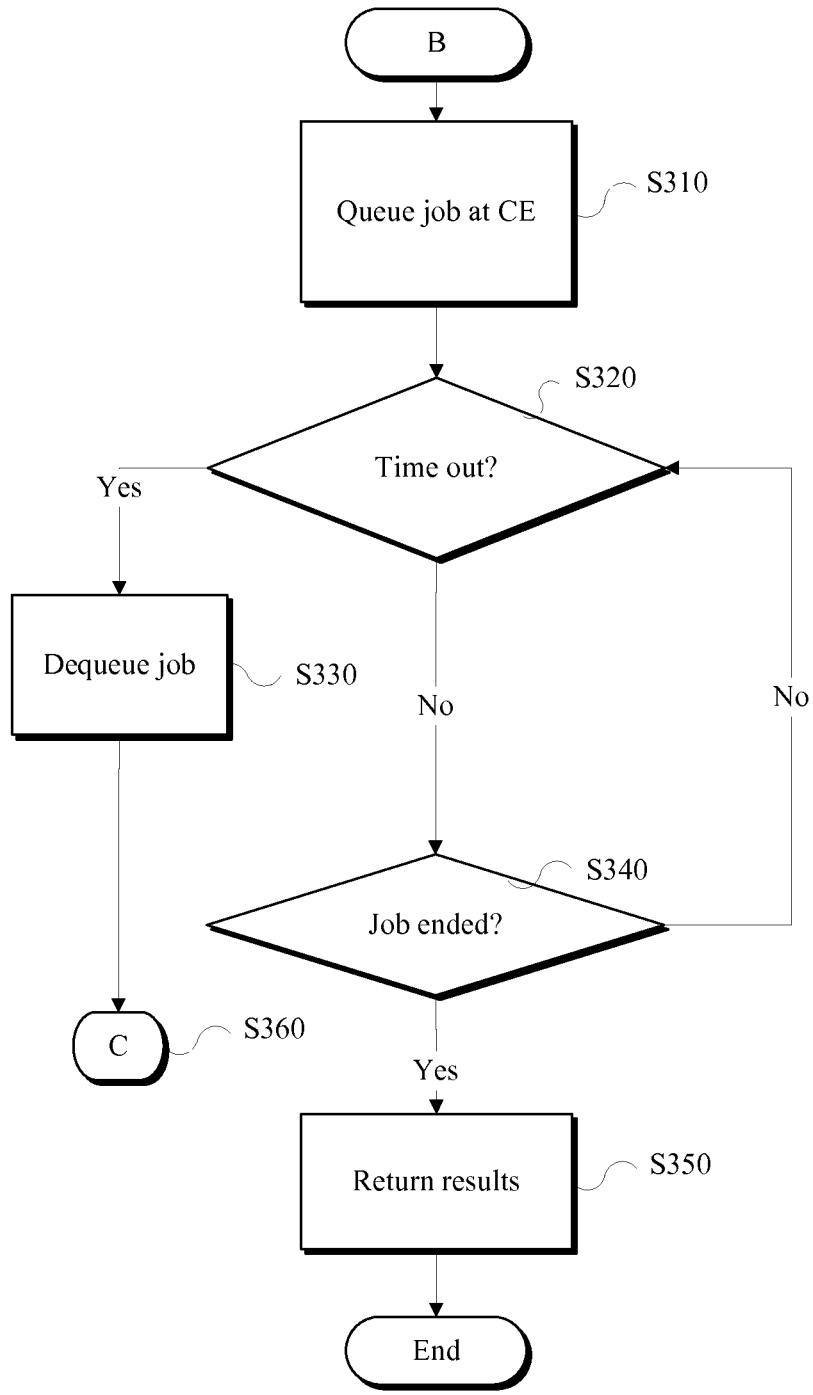

If at least one of the job alternatives can be satisfied, then the WMS 124 finds a CE that can satisfy that job alternative (i.e, desirably the job with highest order of priority) and submits the job to a CE (S230, S240, S250). Referring to FIG. 3, the job is then queued in the selected CE 150 (S310), where the job waits for execution. If the job is not executed within a predetermined time threshold (i.e., if a time out occurs), then the job is removed from the queue (S320, S330) and remedial measures may be taken as provided in further detail below to reschedule the job (S360). In lieu of a timeout, the job is executed and when the job ends the results are returned to the requesting party (S340, S350).

To determine what remedial measures are available, the SA 122 is configured to obtain updated grid status from the CE 150 (e.g., while job waits in queue) and to also obtain analysis results from the WMS 124 and determine whether and how the defined job requirements may be satisfied. In one embodiment, the job description, instead of including a strict set of requirements, may include soft requirements and conditions that would allow the job to be scheduled even if the primary (e.g., preferred) resource allocation option is not available. In one implementation, SA 122 considers an alternative or less preferred resource allocation based on different factors.

For example, in one embodiment, the SA 122 may measure the time before the job will be started based on a first set of requirements (e.g., the primary or preferred requirements). If the timing associated with scheduling the job is not met based on the first set of requirements, then another option that would allow the job to be started with a lower level of resource but at an earlier time may be adopted.

In accordance with one example embodiment, the following process may be implemented in order to provide adaptive scheduling for jobs submitted according to a job description that defines several options or priority levels for the performance of the job and the amount of resources allocated to the job. In other words, a JDL extension may be implemented that provides the user with options to specify a prioritized list of alternative resource requirements for running a job, and conditions which dictate which alternative are acceptable.

For example, a job description may be submitted that suggests the following alternatives for scheduling and running a job based on three set of priorities:

Alternatives—
1st priority alternative: 5 CPUs, Storage Element close to the VM. Optional wait timeout <TO1> for job execution
2nd priority alternative: 5 CPUs Storage Element anywhere-Optional wait timeout <TO2> for job execution
3rd priority alternative: 3 CPUs, Storage Element anywhere, optional wait timeout <TO3> for job execution Execution Flow—
If alternatives are present:
If job server resources are available at some CE 150 to satisfy the $1^{st}$ priority alternative then SA 122 asks WMS 124 to queue the job to that CE 150 and wait indefinitely for execution and then finally return result to the user—unless there are not enough of such resources anywhere or <TO1> (i=1) is specified and expired without the queued job being executed yet. In such cases, SA 122 stops the job wait at CE 150 queue and reiterates the same flow for the $2^{nd}$ priority (i=2) alternative.

Likewise SA 122 reiterates the flow for the 3rd priority (i=3) alternative if the 2nd priority is not executed to completion because of lack of resources or its timeout (optional) at the CE 150 queue expired. If no alternatives are present WMS 124 performs the job JDL.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents. © CIPG

What is claimed is:

1. A method for execution of a job in a grid computing environment, the method comprising:
   receiving, by a computer, a job description that defines a set of job alternatives based on an order of priority, resource requirements, and conditions associated with execution of the job alternatives, wherein the conditions for each job alternative include at least a time threshold;
   providing a user with a plurality of options to specify the order of priority for the received set of job alternatives and conditions for an acceptable set of job alternatives, wherein the plurality of options include implementing a plurality of flexible job description language;
   processing, by the computer, the job alternatives in priority order to determine that resources for executing a first job alternative are available, considering the resource requirements defined in the job description for the first job alternative;
   selecting, by the computer, a first computing element implemented in a virtualized grid computing environment, wherein adding a plurality of virtualized servers for resource utilization, wherein the selected first computing element has sufficient resources to satisfy resource requirements defined in the job description for the first job alternative;

submitting, by the computer, a first job execution request for the job to the first computing element for execution;

in response to determining that execution of the job on the first computing element has not begun within the time threshold defined in the first job description:

canceling, by the computer, the job execution request for the job on the first computing element;

determining, by the computer, that resources for executing a second job alternative having a lower priority order than the first job alternative are available;

selecting, by the computer, a second computing element implemented in the virtualized grid computing environment, wherein the selected second computing element has sufficient resources to satisfy resource requirements defined in the job description for the second job alternative; and submitting, by the computer, a job execution request for the job to the second computing element for execution.

2. The method of claim 1, wherein the selected first and second computing elements queue the job in an associated queue for execution.

3. The method of claim 2, wherein the job is removed from the associated queue if the job is not executed after the threshold time period has passed.

4. The method of claim 1, wherein job alternatives with lower order of priority than a selected job alternative are considered, if sufficient resources are not available to satisfy the selected job alternative, until it is determined that no job alternatives are present for which sufficient resources are available.

* * * * *